(12) United States Patent
Larsen et al.

(10) Patent No.: US 8,635,313 B2
(45) Date of Patent: Jan. 21, 2014

(54) NETWORK DEVICE INSTALLATION

(75) Inventors: Brian Larsen, Bothell, WA (US); David Roberts, Redmond, WA (US); Aaron Cunningham, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 12/141,929

(22) Filed: Jun. 19, 2008

(65) Prior Publication Data

US 2009/0319649 A1 Dec. 24, 2009

(51) Int. Cl.
*G06F 15/177* (2006.01)

(52) U.S. Cl.
USPC .......................................... 709/222; 709/221

(58) Field of Classification Search
USPC .......... 709/220–223, 226, 238, 250; 710/104; 713/1–2, 100; 370/254
See application file for complete search history.

(56) References Cited

U.S. PATENT DOCUMENTS

| | | | | |
|---|---|---|---|---|
| 5,446,897 A * | 8/1995 | Mathias et al. | ............... | 709/220 |
| 5,819,042 A | 10/1998 | Hansen | | |
| 5,980,078 A * | 11/1999 | Krivoshein et al. | ............... | 700/1 |
| 5,987,126 A * | 11/1999 | Okuyama et al. | ............. | 380/203 |
| 6,012,088 A * | 1/2000 | Li et al. | .......................... | 709/219 |
| 6,286,038 B1 * | 9/2001 | Reichmeyer et al. | ......... | 709/220 |
| 6,301,612 B1 * | 10/2001 | Selitrennikoff et al. | ....... | 709/220 |
| 6,516,345 B1 * | 2/2003 | Kracht | ........................ | 709/220 |
| 6,560,659 B1 * | 5/2003 | Tobias et al. | ....................... | 710/8 |
| 6,850,528 B1 * | 2/2005 | Crocker et al. | ............... | 370/401 |
| 6,982,953 B1 * | 1/2006 | Swales | ........................... | 370/218 |
| 7,092,375 B2 | 8/2006 | Pitsoulakis | | |
| 7,168,092 B2 * | 1/2007 | King et al. | ......................... | 726/9 |
| 7,318,095 B2 * | 1/2008 | Husain et al. | ................. | 709/224 |
| 7,355,966 B2 * | 4/2008 | Fike et al. | ...................... | 370/217 |
| 7,483,965 B1 * | 1/2009 | Gerraty | ......................... | 709/221 |
| 7,584,349 B2 * | 9/2009 | Sedlack | ........................... | 713/1 |
| 7,716,276 B1 * | 5/2010 | Ren et al. | ...................... | 709/203 |
| 7,765,181 B2 * | 7/2010 | Thomas et al. | ................ | 709/221 |
| 7,774,441 B2 * | 8/2010 | Frutiger et al. | ................ | 709/221 |
| 8,145,748 B2 * | 3/2012 | Denis et al. | .................... | 709/224 |
| 2001/0027442 A1 * | 10/2001 | Krahn et al. | .................... | 705/51 |
| 2003/0050973 A1 * | 3/2003 | Tracton et al. | ................. | 709/203 |
| 2003/0149988 A1 * | 8/2003 | Ellis et al. | ........................ | 725/87 |

(Continued)

FOREIGN PATENT DOCUMENTS

WO    WO 2006062272 A1 *  6/2006

OTHER PUBLICATIONS

"Transferring Old Configuration Settings to a New ION Enterprise™ Installation", Power Measurement Worldwide, pp. 1-8, Dec. 9, 2003.

*Primary Examiner* — Saleh Najjar
*Assistant Examiner* — Eric W Shepperd
(74) *Attorney, Agent, or Firm* — Toler Law Group, PC (57) ABSTRACT

The disclosure relates to a system and method of processing device settings of a device. In a particular embodiment, the method includes requesting the device to provide the device settings. The device settings include wide area network (WAN) and local area network (LAN) network settings. The method further includes storing the device settings in a device independent format. After the device settings have been stored in the device independent format, the device settings may be subsequently retrieved and used for replacement of the network device in a computer network. In a particular embodiment, the device settings are stored in the device independent format in a second device, such as at a server or a personal computer.

14 Claims, 6 Drawing Sheets

(56) References Cited

U.S. PATENT DOCUMENTS

| | | |
|---|---|---|
| 2004/0249907 A1 | 12/2004 | Brubacher et al. |
| 2005/0071216 A1* | 3/2005 | Yoshitake et al. .............. 705/10 |
| 2005/0203892 A1* | 9/2005 | Wesley et al. ..................... 707/3 |
| 2005/0265342 A1* | 12/2005 | Thakor ......................... 370/389 |
| 2006/0059482 A1 | 3/2006 | Chamberlin et al. |
| 2006/0117371 A1* | 6/2006 | Margulis ....................... 725/131 |
| 2006/0161674 A1* | 7/2006 | Sun et al. ...................... 709/230 |
| 2006/0168656 A1 | 7/2006 | Stirbu |
| 2006/0179131 A1* | 8/2006 | Courtney ...................... 709/220 |
| 2006/0235953 A1 | 10/2006 | Meier |
| 2007/0022185 A1 | 1/2007 | Hamilton et al. |
| 2007/0036358 A1 | 2/2007 | Nguyen et al. |
| 2007/0111568 A1* | 5/2007 | Ferrari et al. ................. 439/131 |
| 2007/0204323 A1 | 8/2007 | Wilkinson et al. |
| 2007/0217434 A1 | 9/2007 | Welbourn |
| 2007/0268514 A1 | 11/2007 | Zeldin et al. |
| 2007/0268516 A1* | 11/2007 | Bugwadia et al. ........... 358/1.15 |
| 2007/0286380 A1* | 12/2007 | Hong et al. .............. 379/201.01 |
| 2007/0294757 A1* | 12/2007 | Stephens et al. ................. 726/12 |
| 2007/0299942 A1 | 12/2007 | Lu et al. |
| 2008/0216154 A1* | 9/2008 | Fontaine ........................... 726/3 |
| 2008/0244043 A1* | 10/2008 | Kawai ........................... 709/221 |
| 2009/0055514 A1* | 2/2009 | Tebbs et al. ................... 709/220 |

\* cited by examiner

NETWORK DEVICE INSTALLATION

TECHNICAL FIELD

The present disclosure is generally related to network device installation.

BACKGROUND

Installing an Internet gateway device or other type of network device can be a difficult process since there may be several scenarios in how the network is connected and since there are many devices that may or may not already be installed at the network.

As an example, a user may want to upgrade a home network by adding a new type of a network device such as a new router. Alternatively, a user may want to upgrade from a traditional router to a wireless router. In such situations, it would be useful to have knowledge and access to the settings of the old device during installation of the new or upgraded device. Further, with the variety of devices sold by different vendors and with different versions of devices offered by the same vendor, the device settings from the old device may not be suitable for or may need to be manually converted to proper configurations for the new network device.

SUMMARY

In a particular embodiment, a method of processing device settings of a network device is disclosed. The method of processing device settings includes requesting a network device to provide device settings and storing the device settings in a device independent format. Device settings include computer network settings, such as local area network settings and wide area network settings. After the device settings have been stored in the device independent format, the device settings may be subsequently retrieved and used for replacement of the network device in a computer network. In a particular embodiment, the device settings are stored in the device independent format in a second device, such as at a server or a personal computer.

In another particular embodiment, a network device replacement method is disclosed. The network device replacement method includes identifying a replacement device, querying the replacement device to determine whether the replacement device is compatible with configuration data in a device independent format, and communicating the configuration data in the device independent format to the replacement device to facilitate installation of the replacement device in a computer network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
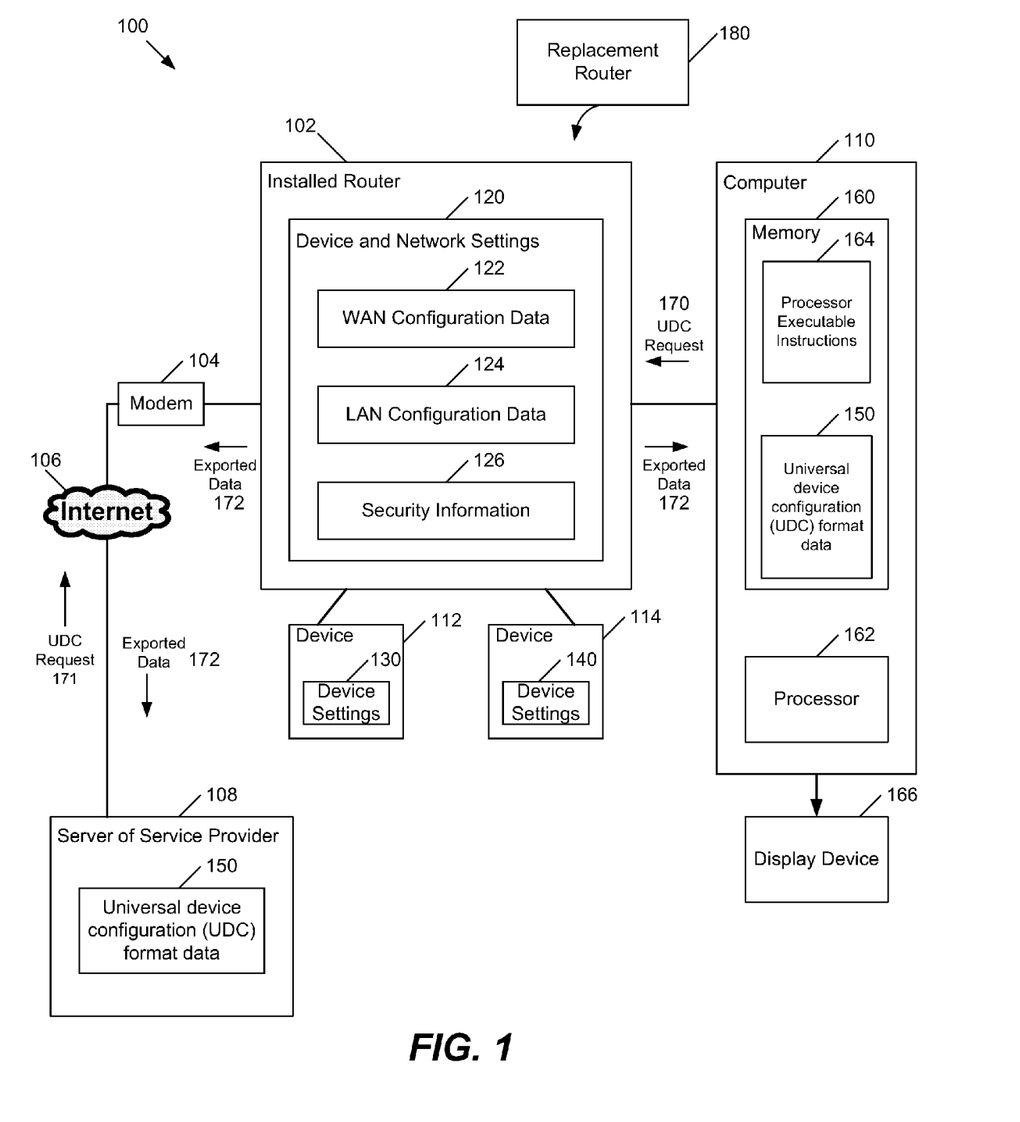
FIG. 1 is a block diagram that illustrates a particular embodiment of a system for retrieving network configuration data of a network device.

Referring to FIG. 1, a particular embodiment of a system to retrieve network device configuration data to support replacement of the network device within a computer network is illustrated. The system includes a representative installed network device 102, such as the illustrated router, a computer 110, and a server of a service provider 108. The installed network device 102 is coupled to the server of the service provider 108 via a modem 104 and a computer network 106. In a particular embodiment, the computer network 106 is the public Internet. The installed network device 102 is intended to be replaced by a replacement router 180. The installed network device 102 is a network device that includes device and network settings 120. The installed network device 102 is coupled to other network devices installed in the network, such as a first illustrative device 112 and a second illustrative device 114 in a network. Each of the first and second devices 112, 114 include a respective set of device settings 130 and 140. The installed network device 102 is coupled for communication with the computer 110 as illustrated. The device and network settings 120 of the installed network device 102 include configuration data, such as wide area network (WAN) configuration data 122 and local area network (LAN) configuration data 124. The device and network settings 120 further include security information 126, such as a user name and password.

The computer 110 includes a processor 162 and a computer memory 160. The computer memory 160 includes processor executable instructions 164. In addition, the computer memory 160 includes a memory area configured to store universal device configuration (UDC) format data 150 that may include device independent network configuration data derived from exported data received from the installed router 102. The computer 110 is coupled to a display device 166 and may be coupled to a user interface such that the computer 110 may be controlled and used by an end user. An example of a suitable computer interface is a keyboard and a computer mouse interface.

During operation, the computer 110 sends a universal device configuration (UDC) request 170 to the installed network device 102. In response to receiving the UDC request 170, the installed network device 102 retrieves configuration data including the WAN configuration data 122 and the LAN configuration data 124. The installed network device 102 may also include device settings data retrieved from external devices, such as the device settings data 130 and the device settings data 140 from the first and second devices 112 and 114, as shown in FIG. 1. An example of device settings includes Internet configurations, LAN network settings, and firewall or parental control settings. Wireless settings may also be included if the user is replacing a wireless router device. The installed network device 102, in response to the UDC request 170, provides exported data including the retrieved configuration data and sends the exported data 172 to the computer 110. The computer 110, in response to receiving the exported data 172, converts the exported data 172 into a device independent format, such as the UDC format, and stores the received exported data 172 in the UDC format in the computer memory 160, as shown at 150.

The exported data 172 is also communicated via the modem 104 and via the network 106 to the server of the service provider 108. The server of the service provider 108 also has the ability to store the converted UDC format data 150 as shown. In addition, the server of the service provider 108 may send a separate independent request for UDC data (UDC request 171), and in response to the UDC request 171, the installed router 102 provides the exported data 172 to the server of the service provider 108.

Since the device configuration data is stored in a device independent format (e.g. the UDC format data 150), the computer 110 or the server of the service provider 108 may use the stored device configuration data for convenient and automated support during installation of a new network device, such as during installation of the replacement router 180 to replace the original installed network device 102, as shown in FIG. 1. As such, the device settings of network devices, including wide area network settings and local area network settings, may be stored in a device independent format in a device other than the installed network device 102. For example, the device settings may be stored in a second device, such as the computer 110 or the server of the service provider 108. In a particular embodiment, the device settings include static data. In another embodiment, the device settings include device specific information, such as audio codecs, video codecs, frame data rates, resolution information, or Digital Living Network Alliance (DLNA) support information. Some aspects of the UDC data file 150 are generic and can apply to all devices while other aspects of the UDC data file 150 are device specific (router, network attached storage (NAS), etc.), similar to device specific files for device profile for web services (DPWS). The UDC data file 150 can be stored locally on the computer 110 or at an online service portal, such as at the server of the service provider 108.

Remote storage is useful if the device being replaced may be damaged and is not available to export settings or if the UDC data file 150 is not located on the computer 110. Portal storage at the server of the service provider 108 can also be used as a mechanism to perform standard installations. For example, an Internet service provider (ISP) or other service provider may host standard configuration files on the portal for devices that they support to provide for a uniform configuration during installations. In a particular embodiment, the device independent data in the UDC format may be used to support provisioning and registration of a second network device (e.g. a new or upgraded device) prior to adding the second network device, such as the replacement router 180, to the computer network. In a particular embodiment, the network device 102 and the replacement device may be different types of network devices other than the router shown. For example, the network device 102 and the replacement device may be a printer, a camera, a digital picture frame, a digital media player, a network attached storage device, a computer, a smart telephone, or other similar device that may be attached to or utilized by a computer network. The replacement network device, such as the replacement router 180, may include logic or processor instructions that are compatible with receiving configuration data in the device independent format (e.g., the UDC format data 150). In an alternative embodiment, the replacement network device does not include logic or other functionality compatible with the UDC format. In this case, the replacement device may include a device driver or may support an alternate protocol that may be used to translate or transfer the configuration data onto the replacement device to support installation of the replacement device within the computer network.

In a particular embodiment, a computer readable media may include a set of computer program instructions that may be executed to cause a machine, such as a processor 162 within the computer 110, to execute the methods of operation as described herein. For example, the computer readable media may include program instructions that cause the processor 162 of the computer 110 to perform operations, such as to request the installed network device 102 to provide device settings such as LAN and WAN network settings data, and to store the device settings in a device independent format. In addition, the computer 110 may identify a replacement device for the network device 102. An example of a replacement device is the replacement router 180 as shown in FIG. 1. The disclosed system and method provide a process of exporting settings from an old network device and guide a user through physical configuration of a replacement device. The disclosed system and method provide for importing old settings into a new network device, upgrading the new network device, and guiding the user through additional configuration settings and options to facilitate fast and easy network device replacement.

Figure 2:
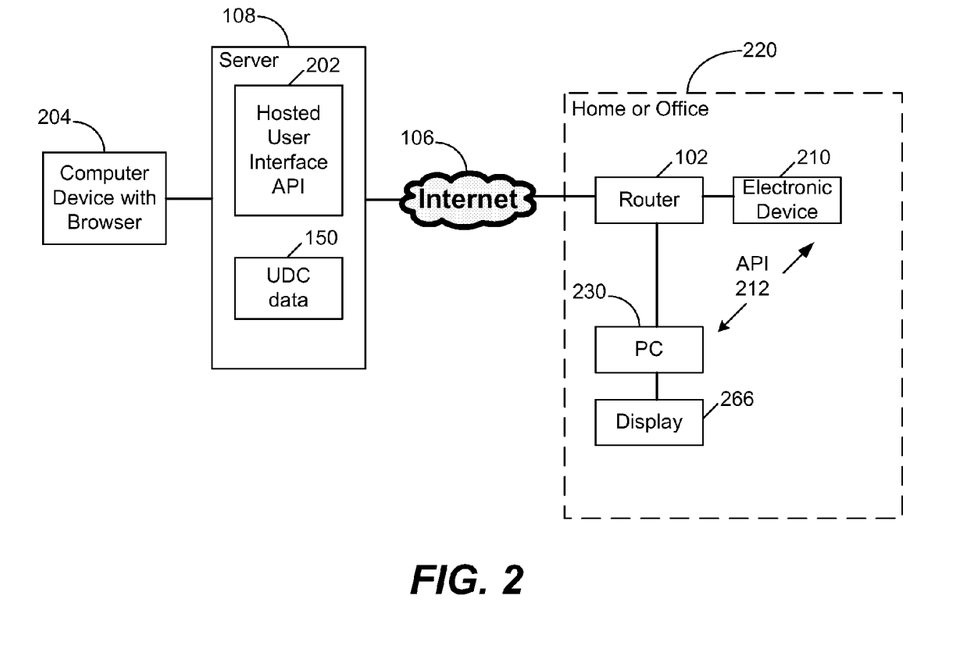
FIG. 2 is a block diagram that illustrates a particular embodiment of a server including a hosted user interface to facilitate network device replacement.

Referring to FIG. 2, a system used to facilitate installation of a replacement network device by remotely storing device independent configuration data is illustrated. The system includes a server of the service provider 108 coupled to a computer device having a browser 204. The server of the service provider 108 includes a hosted user application programming interface (API) 202 and includes UDC format data 150. The server of the service provider 108 is coupled via a computer network 106, such as the Internet, to a remote home or office network 220. The remote network 220 includes an illustrative network device, such as a router 102, coupled to an electronic device 210 and coupled to a representative personal computer (PC) 230. The personal computer 230 is coupled to a display device 266 and interacts with the electronic device 210 via an electronic of the service provider device application programming interface (API) 212.

During operation, a user of any computer having a browser, such as the illustrated computer device 204, may communicate with a remote network via a hosted API 202 of the server of the service provider 108. The server of the service provider 108 also stores device settings of one or more network devices in a universal device configuration (UDC) format 150. The user of the computer device 204 may remotely access and utilize the UDC data 150 as well as the user interface API 212 to remotely configure settings of network devices within the home or office 220. For example, the user of the computer device 204 may selectively access and control settings of the electronic device 210 coupled to the home or office network 220.

Figure 3:
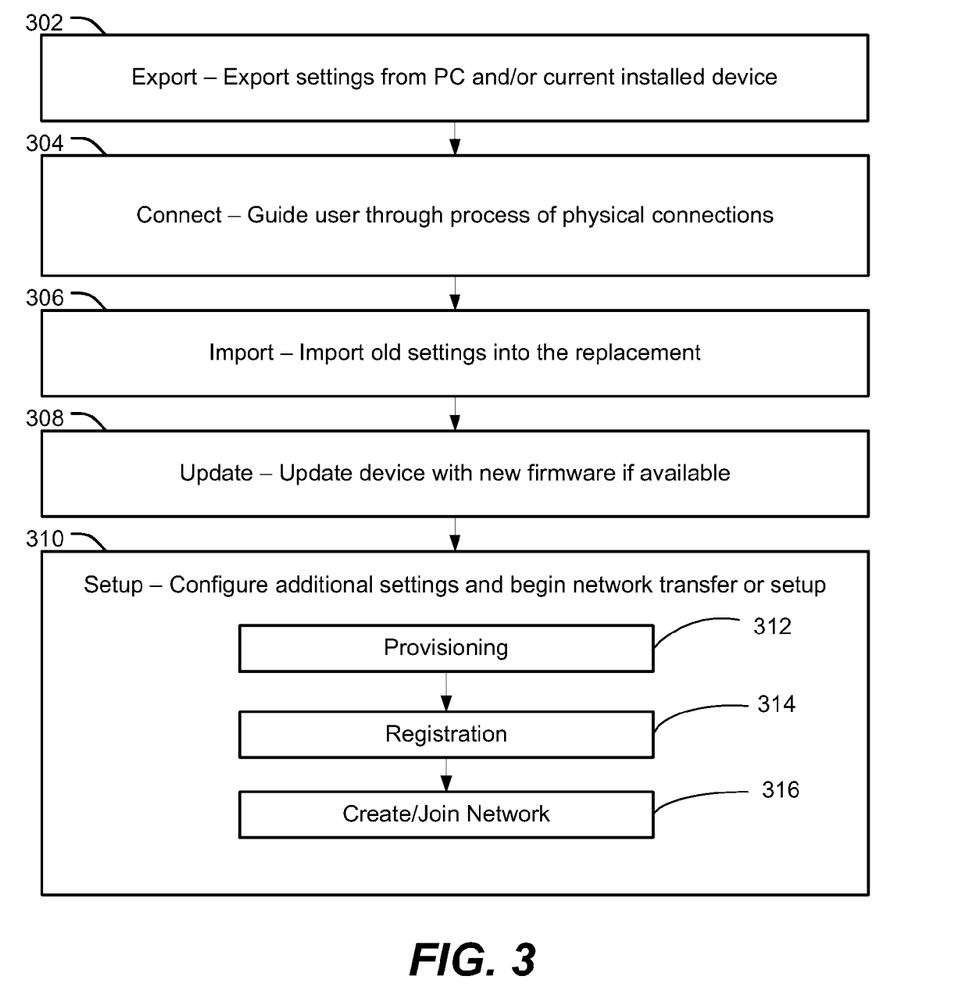
FIG. 3 is a flow diagram that illustrates a particular embodiment of a method of processing device settings of a network device.

Referring to FIG. 3, a method of processing device settings of a network device is shown. The method includes exporting settings from a currently installed network device, such as a router or similar network device, at 302. The method further includes a connection step to guide a user through the process of making physical connections to install a replacement network device, as shown at 304. The connectivity process uses customized images to correctly show the product and connection ports of the product to the end user so that the user understands how to perform physical connections and installation. During this process, other physical attributes of the product may be adjusted to improve the performance of the network device. The connectivity process using the customized images may be implemented by use of an installation wizard program. The installation wizard program may discover a new network device using discovery methods, such as UPNP, LLTD, or WS discovery to locate the new network device. The method further includes importing old settings that were previously stored from the installed device into the replacement network device that is to be installed into the computer network, as shown at 306.

The method further includes updating the replacement network device with new firmware if available or needed, at 308. During this step, the device communicates with the service portal to check for updates. This step is optional where an installation wizard on a setup CD is used for configuration and provides the update functionality. The update process supports devices that require a reset to default to upgrade to a latest image file. In this case, the installation wizard is downloaded locally, exports the latest UDC file, upgrades the network device, and allows the network device to reset defaults prior to importing the UDC data back into the network device. Where the user attempts to perform this process from a wireless connection, the installation wizard reconfigures the personal computer to connect to the default settings of the network device and then reconnects the new settings once imported.

The replacement device is set up by configuring additional settings and beginning a network transfer or setup process, as shown at 310. Once the replacement device has been installed with the latest updates, the setup or provisioning process guides the user through setting up a new network or adding a device to an existing network. The setup provisioning accommodates devices that need to be configured differently based on user preferences. Since many users may not know what operations they intend to perform, the setup provisioning step assists the user with determining their use cases and in configuring home network components as applicable. The setup and configuration process further includes provisioning the replacement network device, at 312, registering the replacement network device, at 314, and creating and/or joining the network with respect to the replacement device, as shown at 316. The provisioning process is used to confirm device connectivity to local Internet based home network services. Registration is used to link the network device to a user identification of the particular user who is responsible for the home network. The create/join network process 316 is used to guide the user in a first time setup of a home network by defining elements that are to be used by the particular user. The join network option may be used when another device is to be added to an existing network, such as when adding network attached storage (NAS).

Figure 4:
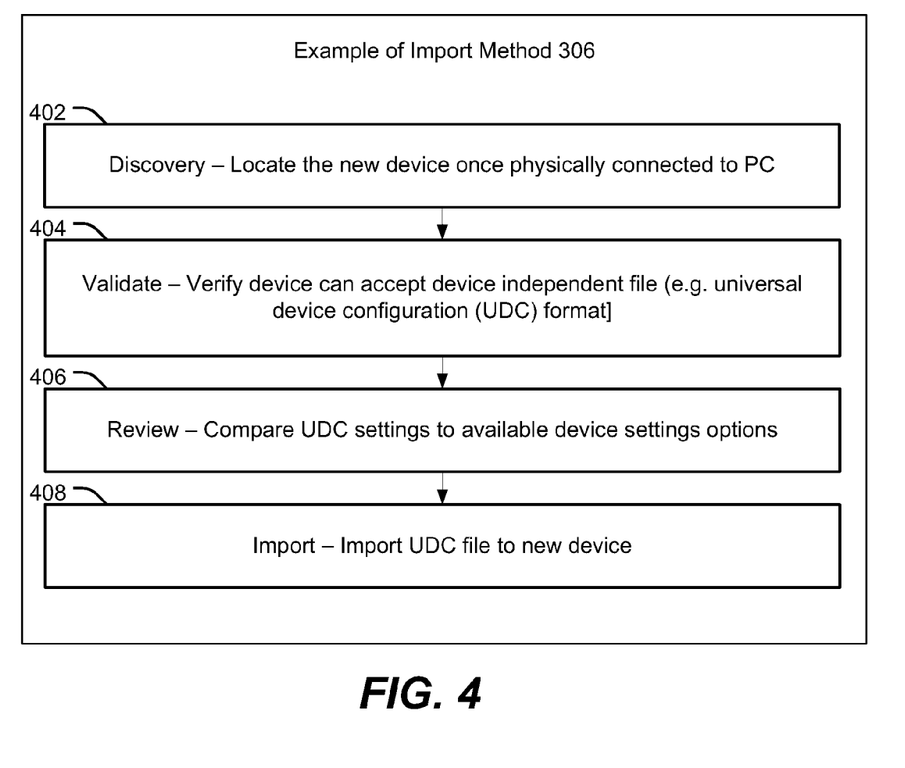
FIG. 4 is a flow diagram that illustrates further details of the method of FIG. 3.

Referring to FIG. 4, further details of the method of replacing a network device with respect to the importation operation 306 illustrated in FIG. 3 are shown. The method of performing the importation operation 306 includes a discovery phase 402. The discovery phase 402 is to locate the replacement network device once there has been a physical connection of the replacement network device to the personal computer. The method of importation 306 further includes a validation phase to verify that the replacement network device can accept a device independent configuration settings file (e.g., universal device configuration (UDC) format data), as shown at 404. The method further includes a review phase to compare the UDC settings to available device setting options at the replacement network device, at 406, and to import the UDC data file to the replacement network device that is to replace the previously installed device, as shown at 408.

Figure 5:
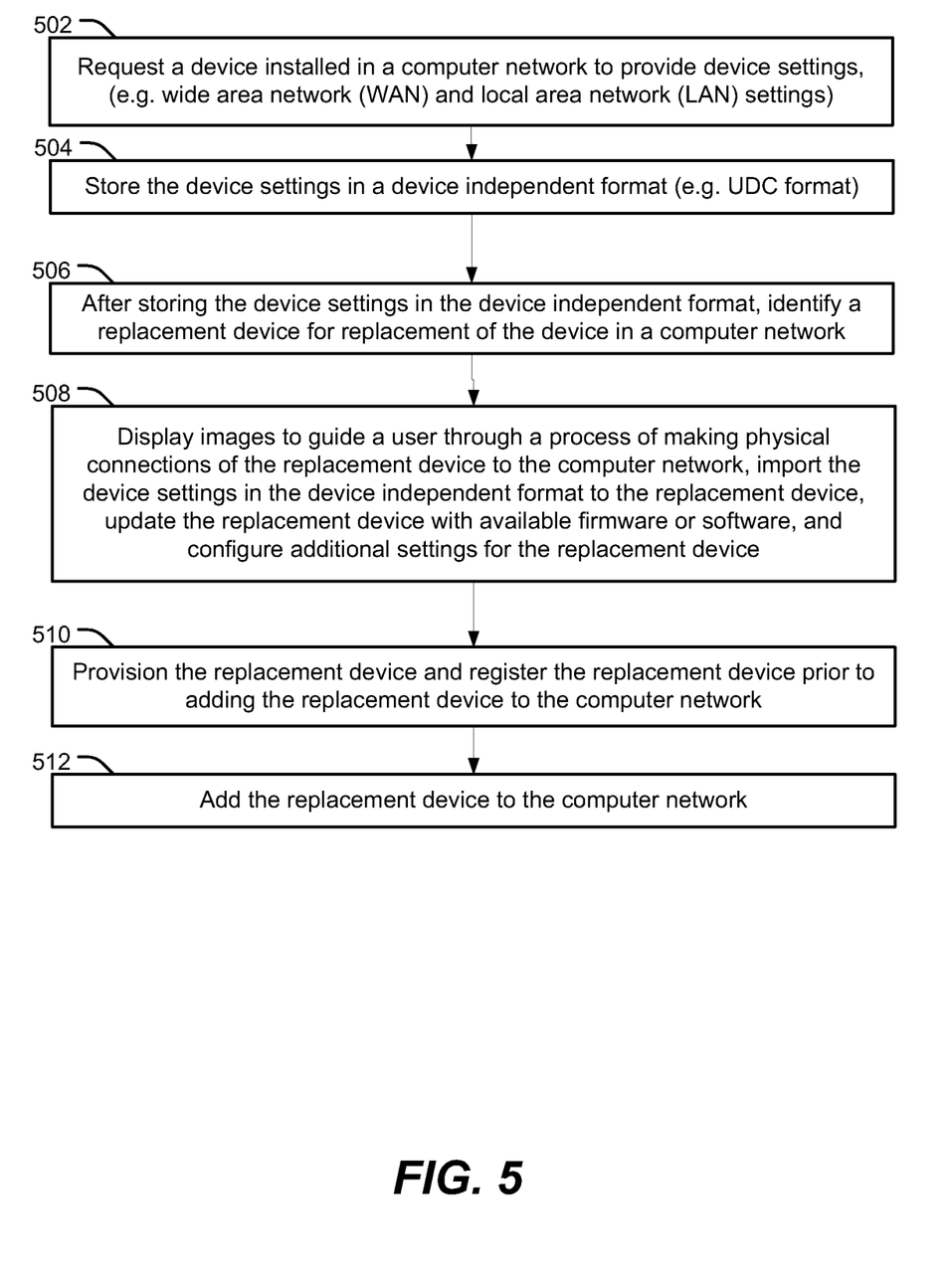
FIG. 5 is a flow diagram that illustrates a particular embodiment of a method of processing device settings of a network device to support replacing the network device at a computer network; and, FIG. 6 is a flow diagram that illustrates a particular embodiment of a method of replacing a network device to be installed in a computer network.

Referring to FIG. 5, a method of processing device settings to facilitate replacement of a network device is shown. The method includes requesting a device installed in a computer network to provide device settings, at 502. In a particular embodiment, the device settings may include LAN settings, WAN settings or other settings of one or more computer network devices attached to the computer network for use in configuration of a replacement network device, such as a replacement router. The method further includes storing the device settings in a device independent format, such as the UDC format, at 504. After storing the device settings in the device independent format, the method includes identifying a replacement network device to replace the installed network device in the computer network, at 506. The method further includes displaying images to guide a user through a process of making physical connections of the replacement network device to the computer network, at 508.

In addition, the method includes importing the device settings in the device independent format to the replacement device, updating the replacement device with available firmware or software, and configuring additional settings for the replacement network device, as shown at 508. The method of network device replacement further includes to provision the replacement network device and to register the replacement network device prior to adding the replacement network device to the computer network, at 510. Further, the method includes adding the replacement network device to the computer network, as shown at 512. In a particular embodiment, the provisioning and registering of the second device (i.e., the replacement network device) occurs prior to adding the second device to the computer network.

Figure 6:
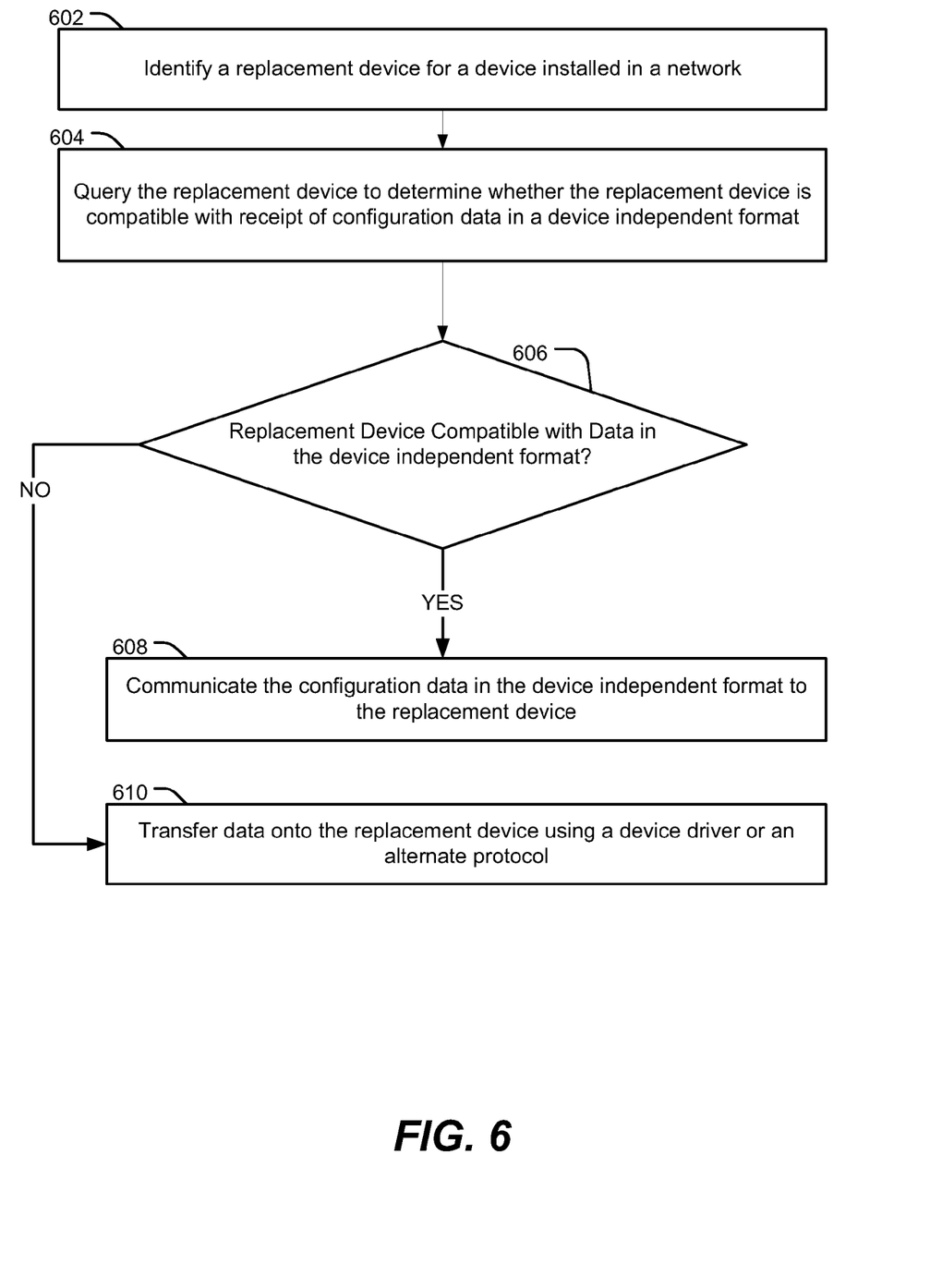

Referring to FIG. 6, another particular embodiment of a method of network device replacement is illustrated. The method includes identifying a replacement device for a device installed in a computer network, at 602. The method further includes querying the replacement device to determine whether the replacement device is compatible with receiving configuration data in a device independent format, at 604. In a particular embodiment, the device independent data format is in the UDC data format and the replacement device is queried to determine whether the replacement device can receive and process the UDC format data.

The method further includes determining whether the replacement device is compatible with data in the device independent format, at 606. If the replacement device is compatible with data in the device independent format, the method proceeds to communicate the configuration data in the device independent format to the replacement device, as shown at 608. If the replacement device is not compatible with data in the device independent format, at 606, the method proceeds to 610 where the data is translated or transferred onto the replacement device using a device driver or using an alternate protocol for transferring the device independent data to the replacement device.

In a particular embodiment, the replacement device is a replacement for an Internet gateway device that was previously installed in a computer network. Also, in a particular embodiment, the universal device configuration data is retrieved by use of a vendor provided device communication driver for the device that is to be replaced. The universal device configuration data may be retrieved by use of an HTML driver to download a configuration file from a user device of the device to be replaced. The HTML driver may automatically log in to a web based user interface to collect the device settings from the device to be replaced.

In another embodiment, a web crawler application is executed to access the web server interface to automatically create the HTML driver for use in device replacement. The use of a web crawler application to automatically go through the web user interface and to automatically create the HTML driver eliminates the need for custom drivers since the application may be launched based on a location of the network device (e.g. IP address) and type of management information to be used (e.g. user name and password). Once the location and management information is provided, the web crawler application may scan available pages in the network device, recording options and settings for replacement installation.

The disclosed system and method include technologies to address device discovery and secure device configuration and control relating to home network applications. A discovery protocol for device discovery may operate at layer two to discover devices that do not have an IP address using options such as LLTD or WS discovery. The configuration and control protocol used to provide a direct and secure link to the device from the Internet and from the local area network side of the device may be implemented using web services functionality. As such, the disclosed system provides communication and ease of installation with respect to both sides of the network device (i.e., from the WAN side and from the LAN side).

The illustrations of the embodiments described herein are intended to provide a general understanding of the structure and use of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
    requesting a first device in a computer network to provide device settings that include wide area network (WAN) configuration data and local area network (LAN) configuration data as part of network settings, the device settings including information specific to the first device;
    converting the device settings including the WAN configuration data and the LAN configuration data to data in a device independent format and storing the data in the device independent format;
    identifying a replacement device to replace the first device in the computer network;
    after the first device is removed from the computer network and after the replacement device is added to the computer network:
        configuring the replacement device based on the data in the device independent format by:
            updating the replacement device with firmware or software;
            configuring additional settings of the replacement device;
            querying the replacement device to determine whether the replacement device is compatible with configuration data in the device independent format; and
            transferring the stored data in the device independent format to the replacement device upon determining that the replacement device is compatible with the configuration data in the device independent format.

2. The method of claim 1, wherein the replacement device is a server, a personal computer, or a router.

3. The method of claim 1, wherein the device settings include a user name and a password.

4. The method of claim 1, wherein the device settings further include parental control settings.

5. The method of claim 1, wherein the device independent format is a universal device configuration (UDC) format.

6. The method of claim 1, further comprising:
displaying images to guide a user to physically connect the replacement device to the computer network.

7. The method of claim 1, further comprising provisioning the replacement device and registering the replacement device prior to adding the replacement device to the computer network, and wherein the first device has a local area network interface and a wide area network interface.

8. The method of claim 1, wherein the device specific information includes audio code information, video code information, frame rate information, resolution information, and Digital Living Network Alliance (DLNA) support information.

9. The method of claim 1, wherein the first device and the replacement device are printers, cameras, digital picture frames, digital media players, network attached storage devices, or smart telephones.

10. The method of claim 1, further comprising receiving second device settings from the replacement device; storing the second device settings; and configuring the replacement device based on the second device settings; updating firmware of the replacement device after storing the second device settings received from the replacement device, wherein updating the firmware of the replacement device resets the replacement device to default settings, and wherein configuring the replacement device based on the second device settings replaces the default settings with the second device settings.

11. A computer readable storage device including instructions that when executed cause a processor to:
request a network device to provide device settings, the device settings including wide area network (WAN) configuration data and local area network (LAN) configuration data as part of network settings, the device settings including information specific to the network device;
receive the device settings from the network device via a device communication driver associated with the network device that is configured to automatically log in to a web based user interface of the network device and to download a configuration file via the web based user interface;
convert the device settings including the WAN configuration data and the LAN configuration data to data in a device independent format and store the data in the device independent format;
identify a replacement device to replace the network device in a computer network;
after the replacement device is added to the network, configuring the replacement device based on the stored data by:
updating the replacement device with firmware or software;
configuring additional settings of the replacement device;
querying the replacement device to determine whether the replacement device is compatible with configuration data in the device independent format; and
transferring the stored data in the device independent format to the replacement device upon determining that the replacement device is compatible with the configuration data in the device independent format.

12. The computer readable storage device of claim 11, further comprising instructions that when executed cause the processor to:
display images to guide a user to physically connect the replacement device to the computer network.

13. The computer readable storage device of claim 12, further comprising instructions that when executed cause the processor to:
provision the replacement device prior to adding the replacement device to the computer network; and
register the replacement device prior to adding the replacement device to the computer network.

14. The computer readable storage device of claim 11, wherein the device communication driver is a vendor provided device communication driver, and wherein certain aspects of the data are generic while other aspects of the data are device specific.

* * * * *